US008380065B2

(12) United States Patent
Okuno et al.

(10) Patent No.: US 8,380,065 B2
(45) Date of Patent: Feb. 19, 2013

(54) OPTICAL ACCESS SYSTEM AND OPTICAL LINE TERMINAL

(75) Inventors: Michitaka Okuno, Kokubunji (JP); Koji Wakayama, Kokubunji (JP); Kenichi Sakamoto, Kokubunji (JP); Hiroki Ikeda, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 641 days.

(21) Appl. No.: 12/582,083

(22) Filed: Oct. 20, 2009

(65) Prior Publication Data
US 2010/0104286 A1    Apr. 29, 2010

(30) Foreign Application Priority Data
Oct. 24, 2008  (JP) .................................. 2008-274085

(51) Int. Cl.
*H04J 14/00*    (2006.01)
(52) U.S. Cl. ............................... 398/66; 398/45; 398/52
(58) Field of Classification Search .................... 398/43, 398/45, 52–54
See application file for complete search history.

(56) References Cited

U.S. PATENT DOCUMENTS

| | | | |
|---|---|---|---|
| 7,885,549 B1 * | 2/2011 | Thinguldstad et al. ....... | 398/168 |
| 2004/0057727 A1 * | 3/2004 | Lim et al. ......................... | 398/58 |
| 2004/0208563 A1 * | 10/2004 | Roberts et al. .................. | 398/70 |
| 2005/0099942 A1 * | 5/2005 | Kurihara ......................... | 370/229 |
| 2007/0041384 A1 * | 2/2007 | Das et al. ..................... | 370/395.4 |
| 2007/0127554 A1 * | 6/2007 | Tamai et al. .................. | 375/141 |
| 2007/0133596 A1 * | 6/2007 | Kim .............................. | 370/465 |
| 2007/0140288 A1 * | 6/2007 | Boyd et al. ..................... | 370/442 |
| 2009/0052894 A1 * | 2/2009 | Murata .......................... | 398/43 |
| 2009/0196606 A1 * | 8/2009 | Miyagi et al. ................... | 398/45 |
| 2009/0232495 A1 * | 9/2009 | Shi et al. ......................... | 398/43 |
| 2010/0316067 A1 * | 12/2010 | Chmara et al. ................ | 370/468 |
| 2011/0020002 A1 * | 1/2011 | Yoon et al. ...................... | 398/63 |
| 2011/0211837 A1 * | 9/2011 | Sugawa et al. .................. | 398/67 |

FOREIGN PATENT DOCUMENTS

| JP | 10-93607 A | 4/1998 |
|---|---|---|
| JP | 2004-201099 A | 7/2004 |

OTHER PUBLICATIONS

IEEE Std 802.3—2005.
Draft Amendment to IEEE Std 802.3—2008, IEEE 802.3av 10G-EPON Task Force, IEEE Draft P802.3av/D3.2, Apr. 3, 2009.

* cited by examiner

*Primary Examiner* — Nathan Curs
*Assistant Examiner* — Tanya Ngo
(74) *Attorney, Agent, or Firm* — Mattingly & Malur, PC

(57) ABSTRACT

Provided is an optical access system comprising: an optical line terminal connected to another network; a plurality of optical network units, each connected to a user terminal; and at least one of an optical switching unit and an optical splitter, which is installed between the optical line terminal and the plurality of optical network units. The optical line terminal allocates a length of time to a discovery phase for detecting the plurality of optical network units, and a length of time to data transmission phases for transferring data from the plurality of optical network units; and changes a ratio of the length of time of the discovery phase to the length of time of the data transmission phases so that the length of time of the discovery phase is shortened in the case where a number of the optical network units that are registered in the optical line terminal increase.

18 Claims, 17 Drawing Sheets

| DISCOVERY FREQUENCY | 1/250 | 1/100 | 1/10 | 1/5 |
|---|---|---|---|---|
| EFFICIENCY OF DATA TRANSMISSION | 99.6% | 99.0% | 90.0% | 80.0% |

| DISCOVERY FREQUENCY : 1/250 | CASE 1 | CASE 2 | CASE 3 | CASE 4 |
|---|---|---|---|---|
| DISTANCE BETWEEN OLT AND ONU | 20km | 40km | 20km | 40km |
| MAX NUMBER OF ONUs | 32 | 32 | 128 | 128 |
| TIME OF DISCOVERY COMPLETION | 1.751s | 7.751s | 7.751s | 31.751s |

| DISCOVERY FREQUENCY : 1/100 | CASE 1 | CASE 2 | CASE 3 | CASE 4 |
|---|---|---|---|---|
| DISTANCE BETWEEN OLT AND ONU | 20km | 40km | 20km | 40km |
| MAX NUMBER OF ONUs | 32 | 32 | 128 | 128 |
| TIME OF DISCOVERY COMPLETION | 0.701s | 3.101s | 3.101s | 12.701s |

| DISCOVERY FREQUENCY : 1/10 | CASE 1 | CASE 2 | CASE 3 | CASE 4 |
|---|---|---|---|---|
| DISTANCE BETWEEN OLT AND ONU | 20km | 40km | 20km | 40km |
| MAX NUMBER OF ONUs | 32 | 32 | 128 | 128 |
| TIME OF DISCOVERY COMPLETION | 0.071s | 0.311s | 0.311s | 1.271s |

| DISCOVERY FREQUENCY : 1/5 | CASE 1 | CASE 2 | CASE3 | CASE 4 |
|---|---|---|---|---|
| DISTANCE BETWEEN OLT AND ONU | 20km | 40km | 20km | 40km |
| MAX NUMBER OF ONUs | 32 | 32 | 128 | 128 |
| TIME OF DISCOVERY COMPLETION | 0.036s | 0.156s | 0.156s | 0.636s | prior art

FIG. 7

| NUMBER OF REGISTERED ONUs (max128) | 0 OR MORE | 16 OR MORE | 32 OR MORE | 48 OR MORE | 64 OR MORE | 80 OR MORE | 96 OR MORE | 112 OR MORE |
|---|---|---|---|---|---|---|---|---|
| DISCOVERY FREQUENCY | 1/12 | 1/14 | 1/16 | 1/19 | 1/24 | 1/32 | 1/49 | 1/100 |
| MAX TIME FOR DISCOVERY COMPLETION | 1.525s | 1.555s | 1.521s | 1.502s | 1.513s | 1.505s | 1.520s | 1.501s |
| EFFICIENCY OF DATA TRANSMISSION | 91.7% | 92.9% | 93.8% | 94.7% | 95.8% | 96.9% | 98.0% | 99.0% |

911

| NUMBER OF REGISTERED ONUs (max128) | 0 OR MORE | 16 OR MORE | 32 OR MORE | 48 OR MORE | 64 OR MORE | 80 OR MORE | 96 OR MORE | 112 OR MORE |
|---|---|---|---|---|---|---|---|---|
| DISCOVERY FREQUENCY | 1/20 | 1/23 | 1/27 | 1/32 | 1/40 | 1/54 | 1/81 | 1/167 |
| MAX TIME FOR DISCOVERY COMPLETION | 2.541s | 2.554s | 2.566s | 2.529s | 2.521s | 2.539s | 2.512s | 2.506s |
| EFFICIENCY OF DATA TRANSMISSION | 95.0% | 95.7% | 96.3% | 96.9% | 97.5% | 98.1% | 98.8% | 99.4% |

912

| NUMBER OF REGISTERED ONUs (max128) | 0 OR MORE | 16 OR MORE | 32 OR MORE | 48 OR MORE | 64 OR MORE | 80 OR MORE | 96 OR MORE | 112 OR MORE |
|---|---|---|---|---|---|---|---|---|
| DISCOVERY FREQUENCY | 1/28 | 1/32 | 1/37 | 1/45 | 1/56 | 1/75 | 1/113 | 1/234 |
| MAX TIME FOR DISCOVERY COMPLETION | 3.557s | 3.553s | 3.516s | 3.556s | 3.529s | 3.526s | 3.504s | 3.511s |
| EFFICIENCY OF DATA TRANSMISSION | 96.4% | 96.9% | 97.3% | 97.8% | 98.2% | 98.7% | 99.1% | 99.6% |

| NUMBER OF REGISTERED ONUs (max 128) | 0 OR MORE | 16 OR MORE | 32 OR MORE | 48 OR MORE | 64 OR MORE | 80 OR MORE | 96 OR MORE | 112 OR MORE |
|---|---|---|---|---|---|---|---|---|
| TIME OF DISCOVERY PHASE | 10.40ms | 9.05ms | 7.70ms | 6.80ms | 5.45ms | 4.10ms | 3.20ms | 1.85ms |
| MAX TIME FOR DISCOVERY COMPLETION | 1.556s | 1.548s | 1.540s | 1.535s | 1.527s | 1.519s | 1.513s | 1.505s |
| EFFICIENCY OF DATA TRANSMISSION | 96.0% | 96.5% | 97.0% | 97.3% | 97.9% | 98.4% | 98.7% | 99.3% |

921

| NUMBER OF REGISTERED ONUs (max 128) | 0 OR MORE | 16 OR MORE | 32 OR MORE | 48 OR MORE | 64 OR MORE | 80 OR MORE | 96 OR MORE | 112 OR MORE |
|---|---|---|---|---|---|---|---|---|
| TIME OF DISCOVERY PHASE | 6.35ms | 5.90ms | 5.00ms | 4.10ms | 3.65ms | 2.75ms | 2.30ms | 1.40ms |
| MAX TIME FOR DISCOVERY COMPLETION | 2.554s | 2.549s | 2.540s | 2.531s | 2.527s | 2.518s | 2.513s | 2.504s |
| EFFICIENCY OF DATA TRANSMISSION | 97.5% | 97.7% | 98.0% | 98.4% | 98.6% | 98.9% | 99.1% | 99.4% |

922

| NUMBER OF REGISTERED ONUs (max 128) | 0 OR MORE | 16 OR MORE | 32 OR MORE | 48 OR MORE | 64 OR MORE | 80 OR MORE | 96 OR MORE | 112 OR MORE |
|---|---|---|---|---|---|---|---|---|
| TIME OF DISCOVERY PHASE | 5.00ms | 4.10ms | 3.65ms | 2.75ms | 2.75ms | 2.30ms | 1.85ms | 1.40ms |
| MAX TIME FOR DISCOVERY COMPLETION | 3.556s | 3.543s | 3.537s | 3.525s | 3.525s | 3.518s | 3.512s | 3.506s |
| EFFICIENCY OF DATA TRANSMISSION | 98.0% | 98.4% | 98.6% | 98.9% | 98.9% | 99.1% | 99.3% | 99.4% |

OPTICAL ACCESS SYSTEM AND OPTICAL LINE TERMINAL

CLAIM OF PRIORITY

The present application claims priority from Japanese patent application JP 2008-274085 filed on Oct. 24, 2008, the content of which is hereby incorporated by reference into this application.

BACKGROUND OF THE INVENTION

This invention relates to an optical access system and, more particularly, to a technique of executing discovery of optical network units quickly.

The recent propagation of Fiber To The Home (FTTH) which uses an optical fiber has increased the speed of access networks. A representative example of FTTH is a passive optical network (PON) system.

A PON system has, as illustrated in FIG. 2, a plurality of (N) optical network units (ONU) 20, which communicate with user terminals 10, and an optical line terminal (OLT) 40, which communicates with a backbone network 60 via a gateway 50. The plurality of ONUs 20 and the OLT 40 are connected to each other via an optical splitter 80, which is a passive device requiring no power feeding. The PON system can thus implement an inexpensive access system 70.

For instance, IEEE 802.3ah standardizes Ethernet-PONs (EPONs) in which data is transferred between an OLT and at least one ONU in conformity to the Ethernet (registered trademark; hereinafter, Ethernet®). Also, the standardization of 10G-EPONs in which the transmission speed is raised to 10 Gbps is in progress (see IEEE 802.3av).

Discovery processing executed in the optical access system as illustrated in FIG. 2 is processing in which a shared optical communication path is used to detect the ONU 20 that has not been registered, the detected ONU 20 is registered, and the communication distance (Round Trip Time (RTT)) between the ONU 20 and the OLT 40 is measured. The discovery processing allows the optical splitter or optical switch to control communication sessions such that overlapping is avoided. The OLT 40 ultimately discriminates a registered ONU 20 from an unregistered ONU 20 by its logical link ID (LLID). The sequence of a discovery procedure in conventional EPONs and 10G-PONs is illustrated in FIG. 4.

In the discovery processing, the ONUs 20 have not been registered and the OLT 40 first uses a Discovery GATE message SIG20 to check the presence of the ONUs 20 that do not have assigned LLIDs. The Discovery GATE message SIG20 is distinguished from a normal GATE message by setting "1" to a discovery flag in the message. An identifier defined for broadcast is used as the LLID and a multicast address is used as the destination MAC address.

The Discovery GATE message SIG20 sent from the OLT 40 travels through the optical splitter 80 and reaches every ONU 20 that is connected to the optical splitter 80. Receiving the Discovery GATE message SIG20, the unregistered ONUs 20 to which LLIDs have not been assigned each send a REGISTER_REQ message SIG30 in order to request the OLT 40 to execute registration.

The plurality of REGISTER_REQ messages SIG30 have to be prevented from bumping into one another in the section between the optical splitter 80 and the OLT 40, but the collision cannot be avoided completely. To lower the chance of collision, each unregistered ONU 20 sends the REGISTER_REQ message SIG30 at a time point T3, which is reached after a random time period elapses since a transmission start time point T2 written in the Discovery GATE message SIG20.

When the REGISTER_REQ message SIG30 is received within a time period defined as a discovery window, the OLT 40 obtains the MAC address of the ONU 20 from which this REGISTER_REQ message SIG30 has been sent, and manages the association relation between the obtained MAC address of the ONU 20 and an LLID. The OLT 40 also starts processing for assigning the LLID to this ONU 20.

The OLT 40 notifies the assigned LLID to the ONU 20 by sending a REGISTER message SIG40 in which the MAC address of this ONU 20 is set as the destination MAC address and the LLID is written. The ONU 20 that has this destination MAC address receives the REGISTER message SIG40 and obtains the assigned LLID. From then on, the assigned LLID is contained in the preamble of a frame sent from the ONU 20, to thereby enable the OLT 40 to identify the source ONU 20. Also, the LLID contained in the preamble of a frame that is sent from the OLT 40 enables the ONU 20 to determine whether the frame is destined to itself.

Thereafter, in order to measure the round trip time RTT between the OLT 40 and the ONU 20, the OLT 40 sends a GATE message SIG50 in which the ONU 20 is specified by its LLID, a multicast address is set as the destination MAC address, and "0" is set to the discovery flag.

The ONU 20 that has the specified LLID receives the GATE message SIG50 and extracts time information (time stamp) T6 and a transmission start time point (grant start time) T7 from the GATE message SIG50. The time stamp T6 is set to a clock of the ONU 20. When the set clock hits the grant start time T7, the ONU 20 sends a REGISTER_ACK message SIG60 to the OLT 40.

The OLT 40 receives the REGISTER_ACK message SIG60 at a time point T8 by its own clock. From T8 and from T7 contained in the received REGISTER_ACK message SIG60, the OLT 40 calculates the round trip time RTT between the OLT 40 and the ONU 20 (RTT=T8−T7).

Through the sequence described above, the registration (LLID assignment) and measurement of the communication distance RTT are finished for one ONU 20. When there are a plurality of unregistered ONUs, one Discovery GATE message SIG20, a plurality of REGISTER_REQ messages SIG30, a plurality of REGISTER messages SIG40, a plurality of GATE messages SIG50, and a plurality of REGISTER_ACK messages SIG60 are exchanged in a single discovery sequence. A plurality of ONUs are registered by exchanging these messages repeatedly.

How frequently the discovery processing is executed is not regulated by IEEE 802.3ah and IEEE 802.3av, and varies from practice to practice. Commonly, as illustrated in FIG. 3, a given period of time is sectioned into N phases one of which serves as a discovery phase, with remaining N-1 phases serving as data transmission phases, and processing of the given period of time is repeated.

SUMMARY OF THE INVENTION

Next, how long it takes to complete discovery for all the ONUs 20 is examined. In the case where the distance between each ONU 20 and the OLT 40 is 20 km, RTT between the OLT 40 and the ONU 20 is about 200 microseconds. When the length of time of a single discovery phase is 1 millisecond and a plurality of ONUs 20 send the REGISTER_REQ messages SIG30 within a discovery window 550 in response to the Discovery GATE message SIG20 of a discovery handshake illustrated in FIG. 4, the time left to exchange the remaining messages, namely, the REGISTER messages SIG40, the GATE messages SIG50, and the REGISTER_ACK messages SIG60, is about 800 microseconds, which is only long enough to register four ONUs 20 at most. When there are thirty-two ONUs 20 to handle and the discovery phase 500 of FIG. 3 is executed once in two hundred and fifty phases, in other words, once for every two hundred and forty-nine data transmission phases 501, the discovery of the last ONU 20 is completed at 1.751 seconds (250 milliseconds×(32/4−1) times+1 millisecond) from the start of the discovery of the first ONU 20. This result is shown in a field for Case 1 in a table 901 of FIG. 7.

An even longer time is required before the discovery of the last ONU 20 is completed in the case where the optical access system has many ONUs 20 and the distance between the OLT 40 and the ONUs 20 is long. For example, in the case where there are a hundred and twenty-eight ONUs 20 and the distance between the OLT 40 and each ONU 20 is 40 km, RTT between the OLT 40 and the ONU 20 is about 400 microseconds. When the length of time of a single discovery phase is 1 millisecond in the discovery handshake of FIG. 4, only one ONU 20 is registered within one discovery phase. Accordingly, the discovery of the last ONU 20 is completed at 31.751 seconds (250 milliseconds×127 times+1 millisecond) from the start of the discovery of the first ONU 20. This result is shown in a field for Case 4 in the table 901 of FIG. 7.

In FIG. 7, the distance between the OLT 40 and the ONUs 20 has two different values, 20 km and 40 km, and the number of the ONUs 20 managed by the OLT 40 has two different values, 32 and 128. FIG. 7 illustrates, in addition to the table 901 in which the discovery phase is executed once in two hundred and fifty phases as described above, a table 902 in which the discovery phase is executed once in a hundred phases, a table 903 in which the discovery phase is executed once in ten phases, and a table 904 in which the discovery phase is executed once in five phases.

An optical access system in which the number of the ONUs 20 managed by the OLT 40 is large and the distance between the OLT 40 and the ONUs 20 is long scores high in terms of practicality but has a problem in that it takes long to complete discovery for all the ONUs 20 as described above. Discovery could be completed for all the ONUs 20 in a short period of time by increasing the frequency of executing a discovery phase as shown in the tables 902, 903, and 904 of FIG. 7. However, it would give rise to another problem of the relative reduction in data transmission phase ratio and the resultant lowering in the efficiency of data transmission as illustrated in FIG. 6.

As countermeasures, methods focusing attention on the discovery window within the discovery phase have been proposed in which the window width of the discovery window or the cycle of generating the discovery window is dynamically changed (see JP 2004-201099 A, for example).

It is therefore an object of this invention to finish discovery for all ONUs in an optical access system within a given period of time (or to cut short the time required to complete discovery for all ONUs) while preventing the efficiency of data transmission in data transmission phases from dropping.

A representative aspect of this invention is as follows. That is, there is provided an optical access system comprising: an optical line terminal which is connected to another network; a plurality of optical network units, each of which is connected to a user terminal; and at least one of an optical switching unit and an optical splitter, which is installed between the optical line terminal and the plurality of optical network units. The optical line terminal allocates a length of time to a discovery phase for detecting the plurality of optical network units, and a length of time to data transmission phases for transferring data from the plurality of optical network units; and changes a ratio of the length of time of the discovery phase to the length of time of the data transmission phases so that the length of time of the discovery phase is shortened in the case where a number of the optical network units that are registered in the optical line terminal increase.

According to an embodiment of this invention, discovery can be completed for all ONUs within a given period of time (or the time required to complete discovery for all ONUs can be cut short) and, at the same time, the efficiency of data transmission is prevented from dropping.

BRIEF DESCRIPTION OF THE DRAWINGS

The present invention can be appreciated by the description which follows in conjunction with the following figures, wherein:

FIG. 7 is a an explanatory diagram illustrating a relation between the discovery phase frequency, a distance between an OLT and an ONU, and a time of discovery completion of the conventional EPON system;

FIG. 8 is an explanatory diagram illustrating tables for determining a threshold for the frequency of executing the discovery phase according to the first embodiment of this invention;

FIG. 15 is an explanatory diagram illustrating tables for determining a threshold for a frequency of the discovery phase according to the second embodiment of this invention;

DETAILED DESCRIPTION OF THE PREFERRED EMBODIMENTS

An outline of an embodiment of this invention is given first.

An optical access system according to the embodiment of this invention has a plurality of optical network units (ONUs) 20, which communicate with user terminals, an optical line terminal (OLT) 40, which communicates with a backbone network 60 via a gateway 50, and an optical splitter 80 (or an optical switching unit (OSW 30)), which connects the plurality of ONUs 20 and the OLT 40. Different time intervals between discovery phases are set for different numbers of the registered ONUs 20. The OLT 40 sets a max time 510 of all ONUs discovery completion. When the max time 510 of all ONUs discovery completion elapses, the OLT 40 chooses a time interval between discovery phases that is suitable for the number of the ONUs 20 that have finished registration by that point, and executes discovery processing at the chosen time interval. The time interval between discovery phases is set small in the case where the number of the registered ONUs 20 is small with respect to the maximum number of the ONUs 20 managed by the OLT 40. In the case where the number of the registered ONUs 20 is large, on the other hand, the time interval between discovery phases is set large.

In an optical access system according to another embodiment of this invention, different lengths of time of a single discovery phase are set for different numbers of the registered ONUs 20. The OLT 40 sets the max time 510 of all ONUs discovery completion. When the max time 510 of all ONUs discovery completion elapses, the OLT 40 chooses a time pf a single discovery phase that is suitable for the number of the ONUs 20 that have finished registration by that point, and executes discovery processing at the chosen time. The time of the single discovery phase is set long in the case where the number of the registered ONUs 20 is small with respect to the maximum number of the ONUs 20 managed by the OLT 40. In the case where the number of the registered ONUs 20 is large, on the other hand, the time of the single discovery phase is set short.

First Embodiment

Described in a first embodiment of this invention is a method of cutting short the time required to complete discovery for all ONUs by dynamically changing the time interval between discovery phases (discovery phase frequency).

Figure 2:
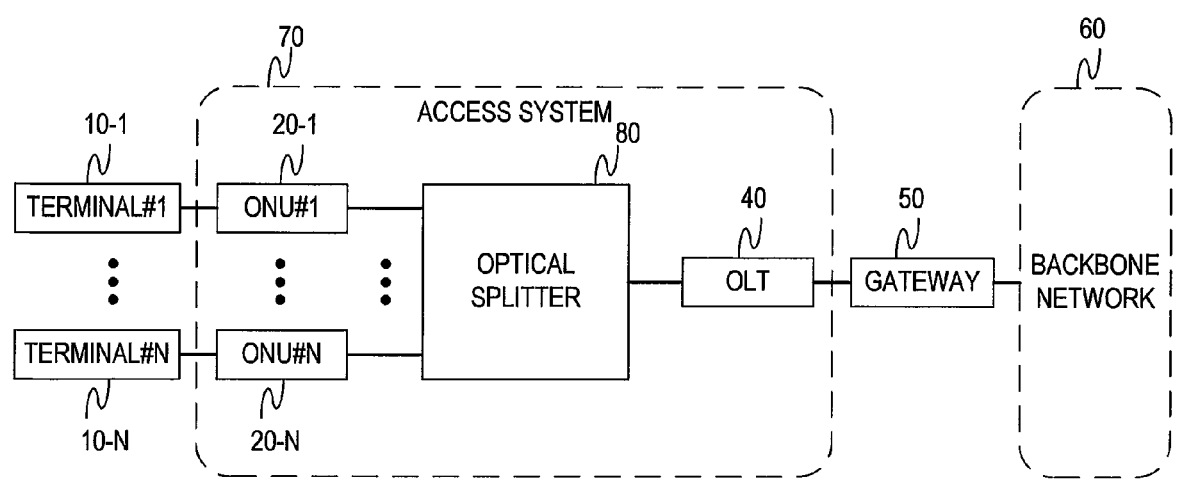
FIG. 2 is a diagram illustrating an example of a configuration of an optical network system according to the first embodiment of this invention.

FIG. 2 is a diagram illustrating a configuration example of an optical network system according to the first embodiment of this invention.

An optical access system 70 has the optical network units (ONUs) 20, the optical splitter 80, and the optical line terminal (OLT) 40.

The optical access system 70 has as many optical network units (ONUs) 20 as the number of users, and the plurality of ONUs 20 are respectively connected to user terminals 10 to communicate with the user terminals 10. The optical line terminal (OLT) 40 is connected to the gateway 50 to communicate with the backbone network 60 via the gateway 50. The plurality of ONUs 20 and the OLT 40 are connected to each other via the optical splitter 80, which is a passive device requiring no power feeding.

Figure 9:
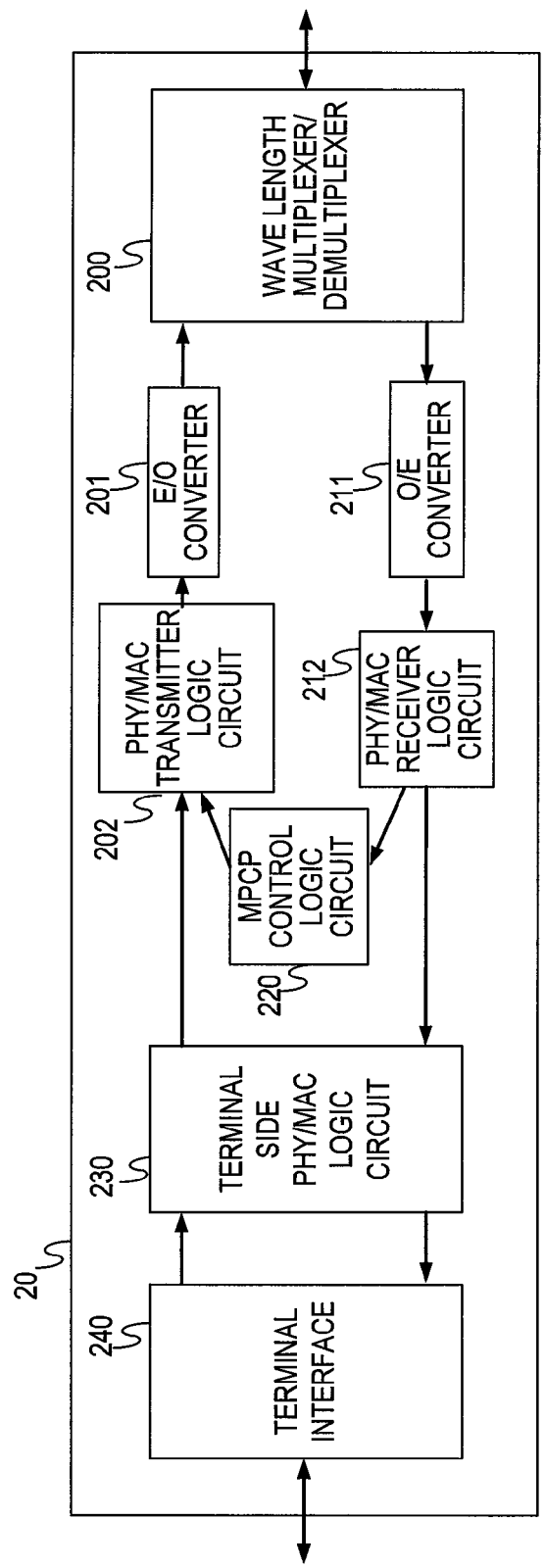
FIG. 9 is a diagram illustrating an example of a configuration of an ONU according to the first embodiment of this invention.

FIG. 9 is a diagram illustrating a configuration example of the ONUs 20 of the first embodiment.

The ONUs 20 of the first embodiment have the same configuration as that of conventional ONUs. Each ONU 20 has a wavelength multiplexer, demultiplexer 200, an E/O converter 201, an O/E converter 211, a PHY/MAC receiver logic circuit 212, a PHY/MAC transmitter logic circuit 202, an MPCP control logic circuit 220, a terminal side PHY/MAC logic circuit 230, and a terminal interface 240.

The wavelength multiplexer, demultiplexer 200 receives an optical signal from the optical splitter 80 and sends an optical signal to the optical splitter 80. The O/E converter 211 converts the received optical signal into an electric signal. The PHY/MAC receiver logic circuit 212 controls frames received from the optical splitter 80. The PHY/MAC transmitter logic circuit 202 controls frames to be sent to the optical splitter 80. The MPCP control logic circuit 220 is a logic circuit for communicating with the OLT 40. The terminal side PHY/MAC logic circuit 230 controls frames sent and received on the user terminal side. The terminal interface 240 is an interface between the ONU 20 and its connected user terminal 10.

Figure 10:
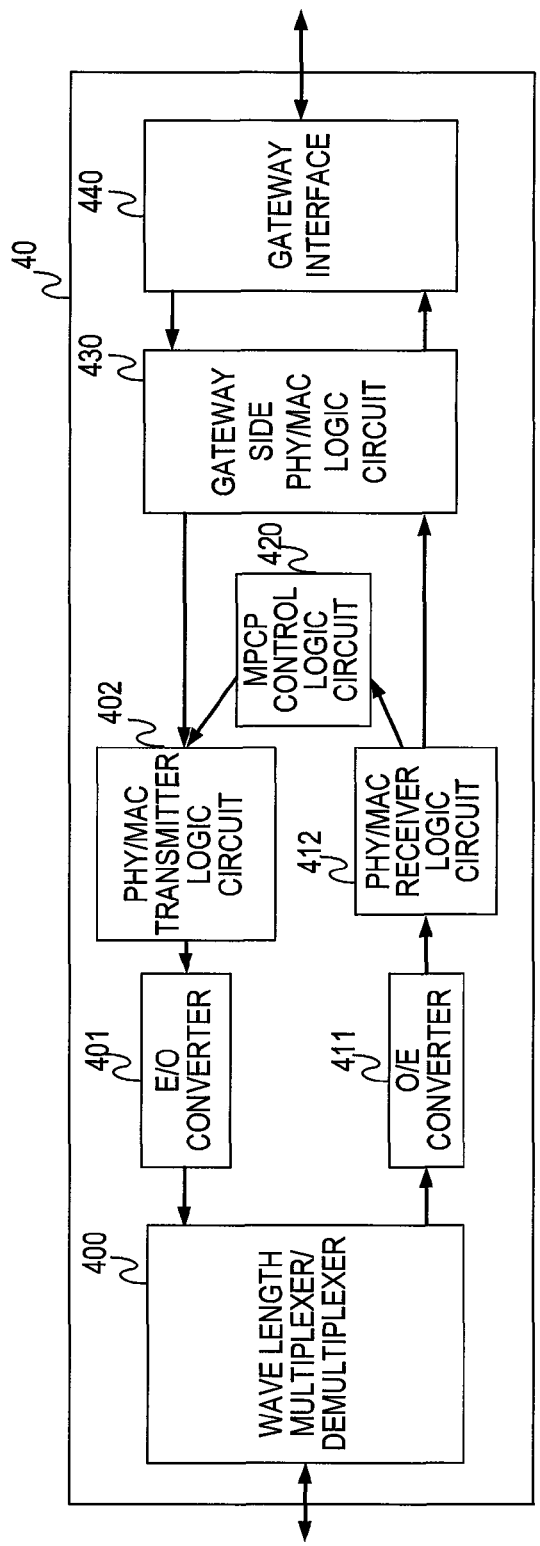
FIG. 10 is a block diagram illustrating an example of a configuration of an OLT according to the first embodiment of this invention.

FIG. 10 is a block diagram illustrating a configuration example of the OLT 40 of the first embodiment.

The OLT 40 has a wavelength multiplexer, demultiplexer 400, an E/O converter 401, an O/E converter 411, a PHY/MAC receiver logic circuit 412, a PHY/MAC transmitter logic circuit 402, an MPCP control logic circuit 420, a gateway side PHY/MAC logic circuit 430, and a gateway interface 440.

The wavelength multiplexer, demultiplexer 400 receives an optical signal from the optical splitter 80 and sends an optical signal to the optical splitter 80. The O/E converter 411 converts the received optical signal into an electric signal. The PHY/MAC receiver logic circuit 412 controls frames received from the optical splitter 80. The PHY/MAC transmitter logic circuit 402 controls frames to be sent to the optical splitter 80. The MPCP control logic circuit 420 controls the plurality of ONUs 20 with the use of multipoint control protocol (MPCP) frames. The gateway side PHY/MAC logic circuit 430 controls frames sent and received on the gateway side. The gateway interface 440 is an interface between the OLT 40 and the gateway 50.

The OLT 40 of this embodiment has the same hardware configuration as that of conventional OLTs, except that the MPCP control logic circuit 420 executes discovery processing that differs from prior art.

Figure 11:
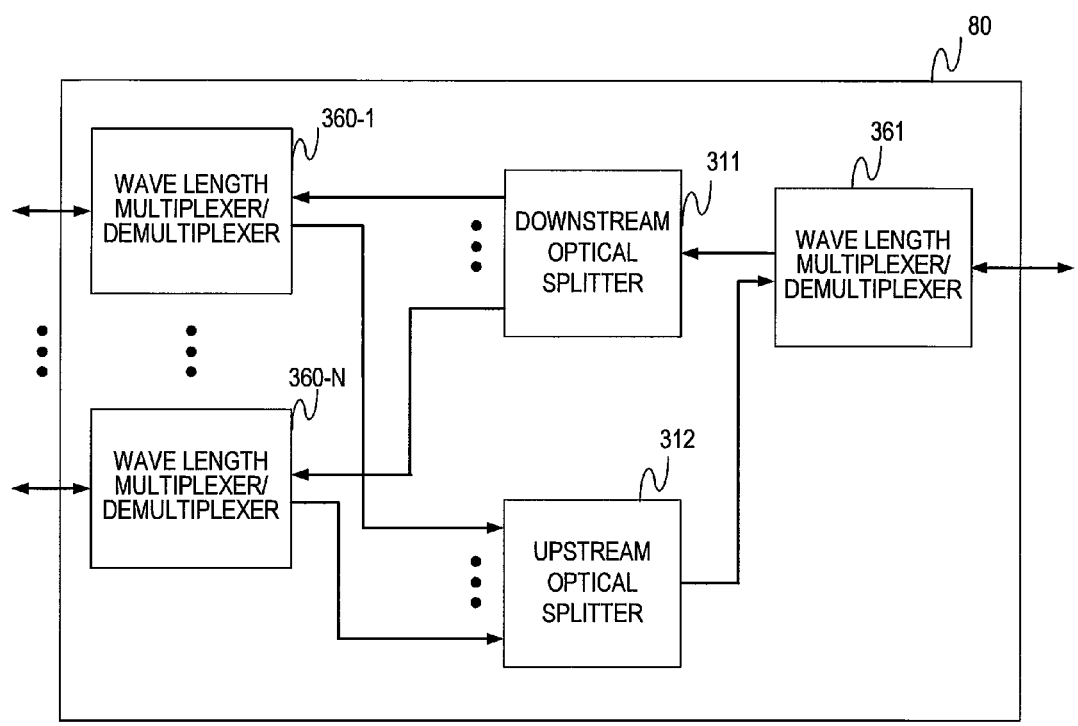
FIG. 11 is a block diagram illustrating an example of a configuration of an optical splitter according to the first embodiment of this invention.

FIG. 11 is a block diagram illustrating a configuration example of the optical splitter 80 of the first embodiment.

The optical splitter 80 of the first embodiment has the same configuration as that of conventional optical splitters. The optical splitter has a wavelength multiplexer, demultiplexer 361, a wavelength multiplexer, demultiplexer 360, a downstream optical splitter 311, and an upstream optical splitter 312.

The wavelength multiplexer, demultiplexer 361 receives an optical signal from the OLT 40 and sends an optical signal to the OLT 40. The wavelength multiplexer, demultiplexer 360 receives optical signals from the ONUs 20 and sends optical signals to the ONUs 20. The downstream optical splitter 311 distributes optical signals from the OLT 40 to the respective ONUs 20. The upstream optical splitter 312 integrates optical signals from the ONUs 20 into one to be sent to the OLT 40.

Figure 1:
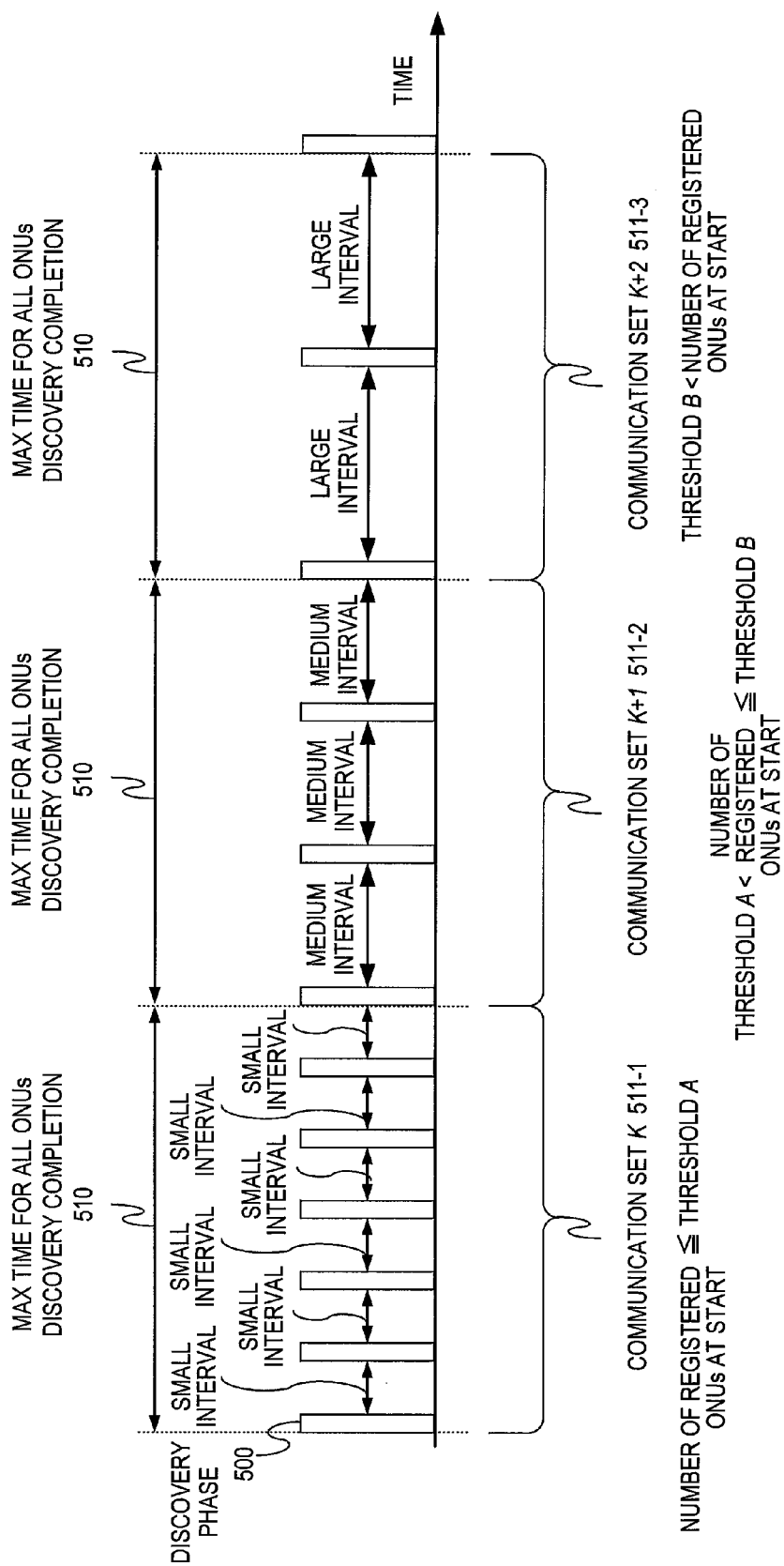
FIG. 1 is a timing chart illustrating an example of changing a frequency of executing a discovery phase according to a first embodiment of this invention.

FIG. 1 is a timing chart illustrating an example of changing the frequency of executing a discovery phase according to the first embodiment.

In the example of FIG. 1, two different thresholds A and B are used as a threshold for the number of the registered ONUs 20 managed by the OLT 40. The threshold B is larger than the threshold A. A constant length of time is set to every discovery phase 500, and three different lengths of time (short, medium, long) are used as a data transmission phases interval between the discovery phases 500. Discovery phases and data transmission phases that are executed within a length of time required to complete discovery for all the ONUs 20 are grouped together into one communication set. In FIG. 1, this length of time required for one communication set is the "max time 510 of all ONUs discovery completion."

Figure 4:
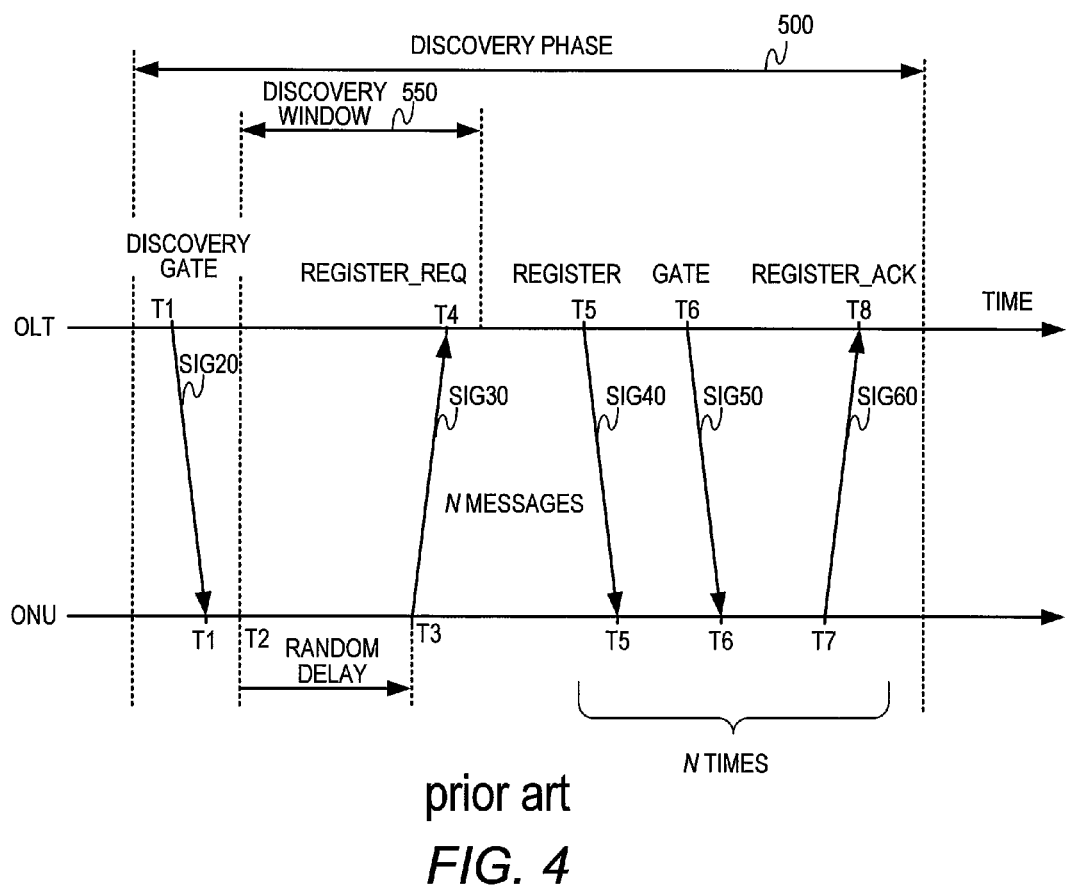
FIG. 4 is a sequence diagram illustrating a discovery handshake of a conventional EPON system.

In a communication set K, which is a first communication set 511-1, when the number of the ONUs 20 that have been registered at the start of this set is equal to or smaller than the threshold A, the length of time between two discovery phases (i.e., length of data transmission phases) is set to a "short length" (small interval). In other words, a discovery phase is executed frequently in order to finish registering all the ONUs 20 at an early point. More discovery phases mean lower efficiency of data transmission. However, with only a small number of ONUs 20 registered, a satisfactory level of data transmission efficiency is accomplished. By the time the max time 510 of all ONUs discovery completion elapses, registration is completed for all the ONUs 20 that have managed to send the REGISTER_REQ messages SIG30 inside the discovery window 550 of FIG. 4 without running into each other.

At the end of the communication set K, there may be the ONU 20 to which the OLT 40 has failed to respond, or the ONU 20 whose registration has been canceled in the middle of the communication, for some reason. The discovery processing is repeated in the subsequent communication sets for the ONUs 20 that have failed to be registered in the communication set K 511-1.

When the number of the registered ONUs 20 managed by the OLT 40 is larger than the threshold A and equal to or smaller than the threshold B, in a communication set K+1, which is the next communication set denoted by 511-2, the length of time between two discovery phases is set to a "medium length" (medium interval). In the communication set K+1 511-2, where the number of the registered ONUs 20 is larger than in the communication set K 511-1, the unregistered ONUs 20 can be registered within the same max time 510 of all ONUs discovery completion through fewer discovery phases. Furthermore, with the data transmission phase set longer, the ONUs 20 that have already been registered are improved in the efficiency of data transmission.

When the number of the registered ONUs 20 managed by the OLT 40 is larger than the threshold B, in a communication set K+2, which is the next communication set denoted by 511-3, the length of time between two discovery phases is set to a "long length" (large interval). In the communication set K+2 511-3, where the number of the registered ONUs 20 is larger than in the communication set K 511-1 and the communication set K+1 511-2, the unregistered ONUs 20 can be registered within the same max time 510 of all ONUs discovery completion through even fewer discovery phases. Furthermore, with the data transmission phase set longer, the ONUs 20 that have already been registered are improved in the efficiency of data transmission.

Figures 5, 6:
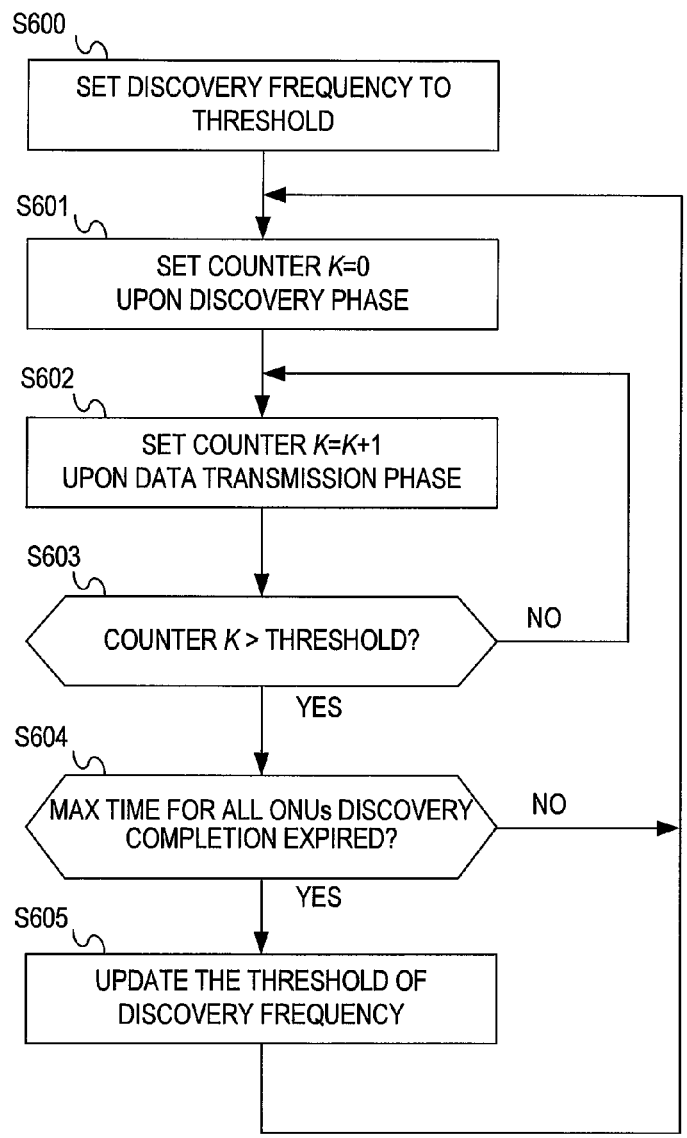
FIG. 5 is a flow chart illustrating a processing of changing the frequency of executing the discovery phase according to the first embodiment of this invention.
FIG. 6 is an explanatory diagram illustrating a relation between a discovery phase frequency and data transmission efficiency of the conventional EPON system.

FIG. 5 is a flow chart for the processing of changing the frequency of executing a discovery phase which is illustrated in FIG. 1. The processing of FIG. 5 is executed by the MPCP control logic circuit 420 of the OLT 40.

First, a threshold that indicates the ratio of a discovery phase to data transmission phases is set (S600) and then the first communication set is started. In the first communication set, a discovery phase is executed first and a counter K is initialized to zero (S601). The counter K counts how many data transmission phases are executed in one communication set (the length of time of data transmission phases).

Next, a data transmission phase is executed and the value of the counter K is increased by 1 (S602). Thereafter, whether or not the value of the counter K has exceeded the threshold is determined (S603). When the value of the counter K is not over the threshold, the MPCP control logic circuit 420 returns to Step S602 to repeat a data transmission phase. When the value of the counter K is over the threshold, on the other hand, whether or not the length of time elapsed since the start of the current communication set has exceeded the max time 510 of all ONUs discovery completion is determined (S604).

When it is found as a result that the elapsed time of the communication set has not exceeded the max time 510 of all ONUs discovery completion, the MPCP control logic circuit 420 returns to Step S601 to execute a discovery phase. When the elapsed time of the communication set exceeds the max time 510 of all ONUs discovery completion, the number of the ONUs 20 that have been registered by that point is referred to in order to update the threshold (S605). The MPCP control logic circuit 420 then returns to Step S601 to execute a discovery phase.

FIG. 8 is an explanatory diagram of tables for determining a threshold for the discovery phase ratio (discovery phase ratio information), and is used in Step S605 of the processing of FIG. 5.

In a table 911 of FIG. 8, the max time 510 of all ONUs discovery completion is about 1.5 seconds, the maximum number of the ONUs 20 managed by the OLT 40 is 128, and the discovery phase ratio is updated each time the number of the registered ONUs 20 increases by 16. The table 911 also shows the efficiency of data transmission for each discovery phase ratio.

For example, when the number of the registered ONUs 20 is 0 or more and less than 16, the discovery phase ratio is 1/12, which means that the discovery phase is executed once in twelve phases while the data transmission phase is executed eleven times. As can be seen in the table 911, a desirable relation is obtained in which the discovery phase frequency in a communication set is lowered and the efficiency of data transmission is improved as the number of the registered ONUs 20 increases.

A table 912 and a table 913 show cases where the max time 510 of all ONUs discovery completion is set to about 2.5 seconds and about 3.5 seconds, respectively. It is understood from the tables 912 and 913 that increasing the max time 510 of all ONUs discovery completion lowers the discovery phase frequency and improves the efficiency of data transmission.

In the tables 911, 912, and 913, the number of the registered ONUs 20 is classified into eight different ranges to set a discovery phase ratio for each of the eight ranges as a discovery threshold. Instead, more discovery thresholds may be used. For example, when the maximum number of the ONUs 20 managed by the OLT 40 is 128, a hundred and twenty-eight discovery thresholds may be used. Discovery phase ratios corresponding to discovery thresholds may be prepared in advance, or may be calculated each time.

An example of a formula of this calculation is shown in Mathematical Expression (1). The premise of the calculation by Expression (1) is that every ONU 20 is placed far enough from the OLT 40 and that only one ONU 20 is registered in a single discovery phase.

$$\text{DISCOVERY PHASE THRESHOLD} = \text{ROUNDDOWN}((\text{MAXIMUM ALL ONU DISCOVERY COMPLETION TIME} - \text{PHASE TIME})/(\text{MAXIMUM ONU COUNT} - \text{REGISTERED ONU COUNT}) * \text{PHASE TIME})) \quad (1)$$

In Expression (1), "discovery phase threshold" represents how many phases in total are executed to execute the discovery phase once, including the one discovery phase, and "RUNDOWN" means that the fraction is rounded down.

The first embodiment describes an optical access system that has the optical splitter 80 as illustrated in FIG. 2. However, this invention is also applicable to an optical access system as the one illustrated in FIG. 14 in which an active optical switch (OSW) 30 is introduced in place of the optical splitter 80.

As has been described, according to the first embodiment of this invention, where the OLT 40 sets a maximum time for completing discovery for all the ONUs 20 and dynamically changes the discovery phase ratio to suite the number of the ONUs 20 that have been registered, discovery can be completed for all the ONUs 20 within a given period of time, or at least the time required to complete discovery for all the ONUs 20 can be cut short, and the efficiency of data transmission is prevented from dropping.

Second Embodiment

A second embodiment of this invention is described next which deals with a method of cutting short the time required to complete discovery for all the ONUs 20 by dynamically changing the length of a single discovery phase, instead of changing the time interval between discovery phases.

An optical access system of the second embodiment has the same configuration as that of the optical access system of the first embodiment which is equipped with the optical splitter 80 as described above with reference to FIG. 2. The second embodiment is also applicable to the optical access system of FIG. 14 which has the active optical switch 30 instead of the optical splitter 80.

Figure 12:
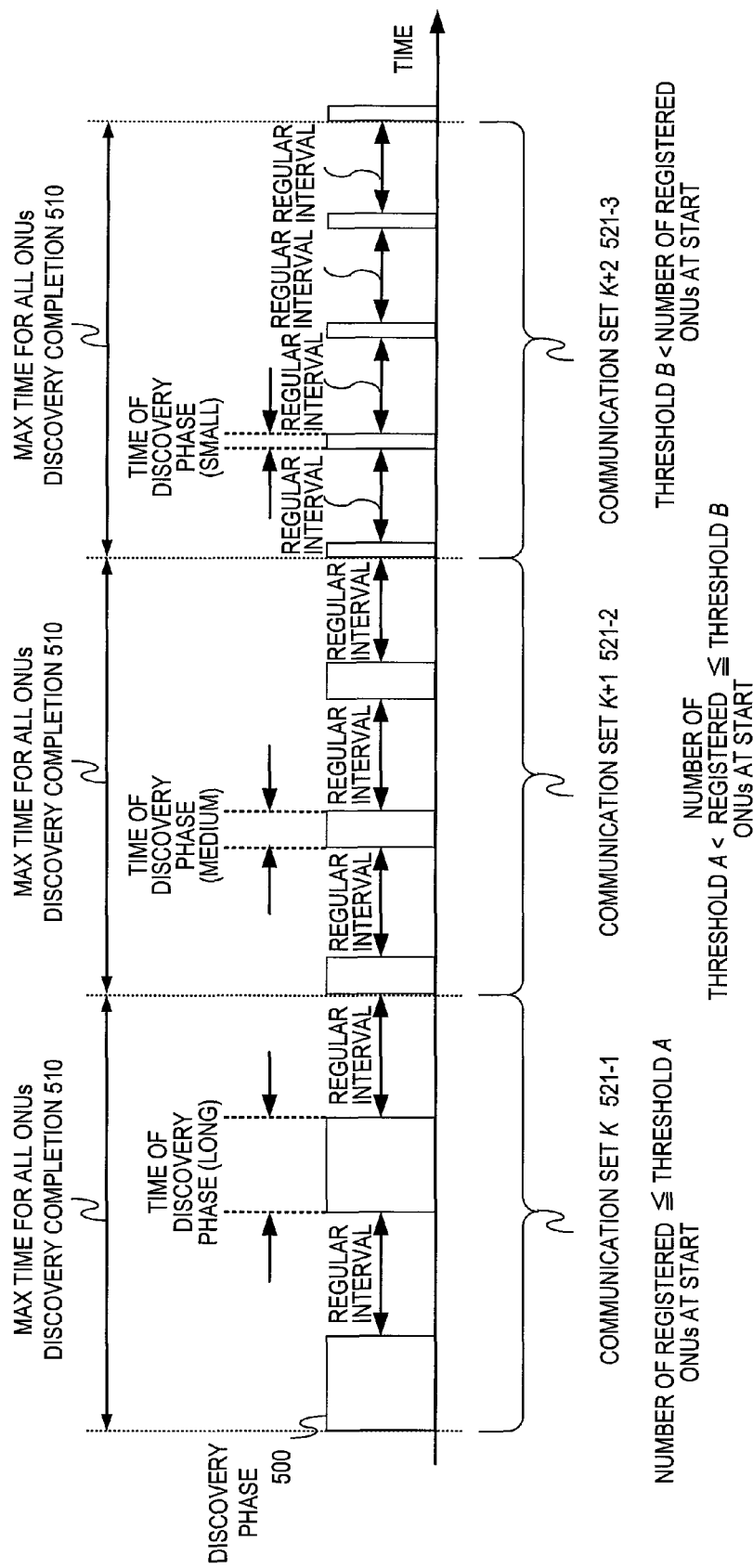
FIG. 12 is a timing chart illustrating an example of changing a length of time of executing a discovery phase according to a second embodiment of this invention.

FIG. 12 is a timing chart illustrating an example of changing the length of time of executing a discovery phase according to the second embodiment.

In the example of FIG. 12, two different thresholds A and B are used as a threshold for the number of the registered ONUs 20 managed by the OLT 40. The threshold B is larger than the threshold A. A constant length of time is set to a data transmission phase between two discovery phases 500, and three different lengths of time (long, medium, short) are used as a time of a single discovery phase. Discovery phases and data transmission phases that are executed within a length of time required to complete discovery for all the ONUs 20 are grouped together into one communication set. In FIG. 12, this length of time required for one communication set is the "max time 510 of all ONUs discovery completion."

In a communication set K, which is a first communication set 521-1, when the number of the ONUs 20 that have been registered at the start of this set is equal to or smaller than the threshold A, the time of the single discovery phase is set to a "long length" (large interval). In other words, the time of the single discovery phase is set to be long in order to finish registering all the ONUs 20 at an early point. Longer time of the single discovery phase means lower efficiency of data transmission. However, with only a small number of ONUs 20 registered, a satisfactory level of data transmission efficiency is accomplished. By the time the max time 510 of all ONUs discovery completion elapses, registration is completed for all the ONUs 20 that have managed to send the REGISTER_REQ messages SIG30 inside the discovery window 550 of FIG. 4 without running into each other.

At the end of the communication set K, there may be the ONU 20 to which the OLT 40 has failed to respond, or the ONU 20 whose registration has been canceled in the middle of the communication, for some reason. The discovery processing is repeated in the subsequent communication sets for the ONUs 20 that have failed to be registered in the communication set K 521-1.

When the number of the registered ONUs 20 managed by the OLT is larger than the threshold A and equal to or smaller than the threshold B, in a communication set K+1, which is the next communication set denoted by 521-2, the time of the single discovery phase is set to a "medium length" (medium interval). In the communication set K+1 521-2, where the number of the registered ONUs 20 is larger than in the communication set K 521-1, the unregistered ONUs 20 can be registered within the same max time 510 of all ONUs discovery completion through a shorter time of the single discovery phase. Furthermore, with the data transmission phase set longer, the ONUs 20 that have already been registered are improved in the efficiency of data transmission.

When the number of the registered ONUs 20 managed by the OLT is larger than the threshold B, in a communication set K+2, which is the next communication set denoted by 521-3, the time of the single discovery phases is set to a "short length" (small interval). In the communication set K+2 521-3, where the number of the registered ONUs 20 is larger than in the communication set K 521-1 and the communication set K+1 521-2, the unregistered ONUs 20 can be registered within the same max time 510 of all ONUs discovery completion through an even shorter time of the single discovery phase. Furthermore, with the data transmission phase set longer, the ONUs 20 that have already been registered are improved in the efficiency of data transmission.

Figure 13:
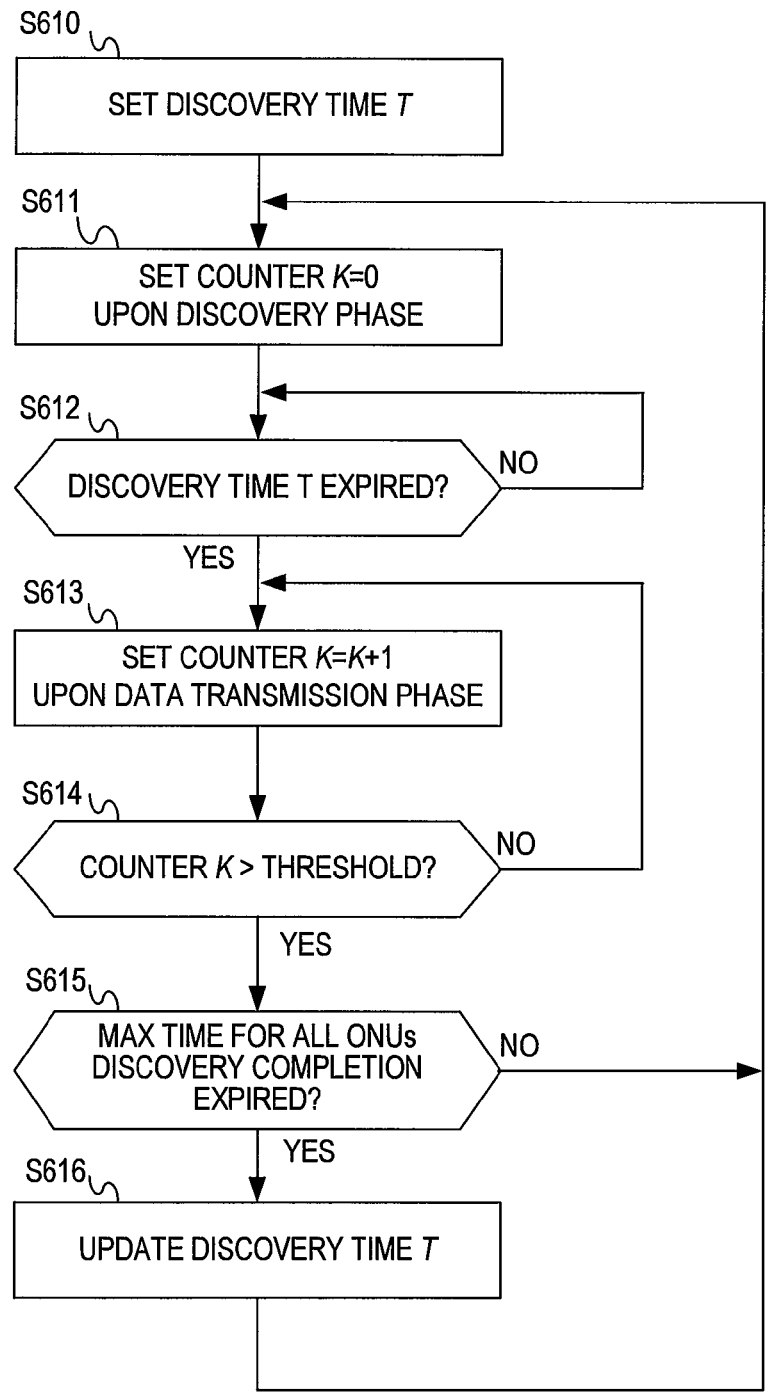
FIG. 13 is a flow chart illustrating a processing for changing a length of time of executing the discovery phase according to the second embodiment of this invention.

FIG. 13 is a flow chart for the processing of changing the length of time of executing a discovery phase which is illustrated in FIG. 12. The processing of FIG. 12 is executed by the MPCP control logic circuit 420 of the OLT 40.

First, a time T of a single discovery phase is set to an initial value (S610) and then the first communication set is started. In the first communication set, a discovery phase is executed first and the counter K is initialized to zero (S611). The MPCP control logic circuit 420 then stands by until the run time of the discovery phase exceeds the time T (S612).

When the time T has elapsed, a data transmission phase is executed and the value of the counter K is increased by 1 (S613). Thereafter, whether or not the value of the counter K has exceeded a predetermined value is determined (S614). When the value of the counter K is not over the predetermined value, the MPCP control logic circuit 420 repeats a data transmission phase (S613). When the value of the counter K is over the predetermined value, on the other hand, whether or not the length of elapsed time has exceeded the max time 510 of all ONUs discovery completion is determined (S615).

When it is found as a result that the elapsed time of the communication set has not exceeded the max time 510 of all ONUs discovery completion, the MPCP control logic circuit 420 returns to Step S611 to execute a discovery phase. When the elapsed time of the communication set exceeds the max time 510 of all ONUs discovery completion, the number of the ONUs 20 that have been registered by that point is referred to in order to update the time T of the single discovery phase (S616). The MPCP control logic circuit 420 then executes a discovery phase (S610).

FIG. 15 is an explanatory diagram of tables for determining a threshold for the discovery phase ratio (discovery time information), and is used in Step S616 of the processing of FIG. 12.

Figure 3:
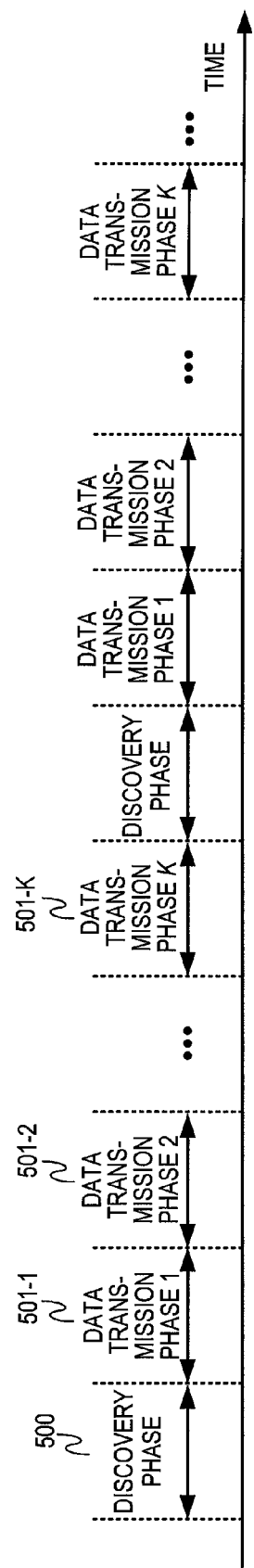
FIG. 3 is a timing chart illustrating a data transmission phase according to the first embodiment of this invention.

FIG. 15 illustrates in a table 921, a table 922, and a table 923 relations among the number of the registered ONUs 20, the time of the single discovery phase time, and the efficiency of data transmission when the time required to complete discovery is about 1.5 seconds, about 2.5 seconds, and about 3.5 seconds, respectively. In the tables 921, 922, and 923, the length of time of the data transmission phase 501 illustrated in FIG. 3 is 1 millisecond and the discovery phase 500 having a specified length is executed once in two hundred and fifty phases. In other words, the frequency of executing a discovery phase is once in two hundred and fifty times. The distance between the OLT and the ONUs is 40 km, and the number of ONUs that the OLT accommodates is 128. Of a discovery phase, a period from the transmission of the Discovery GATE message SIG20 to the end of the discovery window 550 is 500 milliseconds, and a group of signals necessary to register a single ONU, specifically, the REGISTER message SIG40, the GATE message SIG50, and the REGISTER_ACK message SIG60, is exchanged in 450 milliseconds.

As can be seen in the tables 921, 922, and 923 of FIG. 15, a specified length of time to complete discovery is met while setting the time of the single discovery phase time long when the number of the registered ONUs 20 is small and setting the time of the single discovery phase time short when the number of the registered ONUs 20 is large.

In the tables 921, 922, and 923, the number of the registered ONUs 20 is classified into eight different ranges to set time T of the single discovery phase for each of the eight ranges as a discovery threshold. Instead, more discovery thresholds may be used. For example, when the maximum number of the ONUs 20 managed by the OLT 40 is 128, a hundred and twenty-eight discovery thresholds may be used. The time T of the single discovery phase corresponding to the discovery threshold may be prepared in advance, or may be calculated each time.

An example of a formula of this calculation is shown in Mathematical Expressions (2) and (3). The time of the single discovery phase time T that satisfies Expressions (2) and (3) both needs to be obtained.

TIME OF SINGLE DISCOVERY PHASE T= ROUNDDOWN ((MAXIMUM ALL ONU DISCOVERY COMPLETION TIME/REPETITION COUNT)−DATA TRANSFER PHASE COUNT IN COMMUNICATION SET*PHASE TIME)  (2)

TIME OF SINGLE DISCOVERY PHASE T=RTT+ DW+((MAXIMUM ONU COUNT)−(REGISTERED ONU COUNT))/REPETITION COUNT*RTT  (3)

In Expression (2), "ROUNDDOWN" means that the fraction is rounded down, and "repetition count" is an integer that determines how many times a discovery phase is to be executed within the max time for all ONUs discovery completion. This integer equals to the number of communication sets contained in the max time for all ONUs discovery completion.

In Expression (3), "RTT" represents the length of communication from the OLT to the ONU and back, "DW" represents the length of the discovery window, and "repetition count" is the same as the repetition count of Expression (2). A small repetition count makes the time of the single discovery phase time a very long period of time during which no data transfer phase is executed, and can deteriorate the data transmission response. On the other hand, a large repetition count may make the time of the single discovery phase time too short to execute discovery even once. Therefore, an appropriate repetition count within the permissible zone should be selected.

As has been described, according to the second embodiment of this invention, where the OLT 40 sets a maximum time for completing discovery for all the ONUs 20 and dynamically changes the time of the single discovery phase time to suite the number of the ONUs 20 that have been registered, discovery can be completed for all the ONUs 20 within a given period of time, or at least the time required to complete discovery for all the ONUs 20 can be cut short, and the efficiency of data transmission is prevented from dropping.

Third Embodiment

Figure 14:
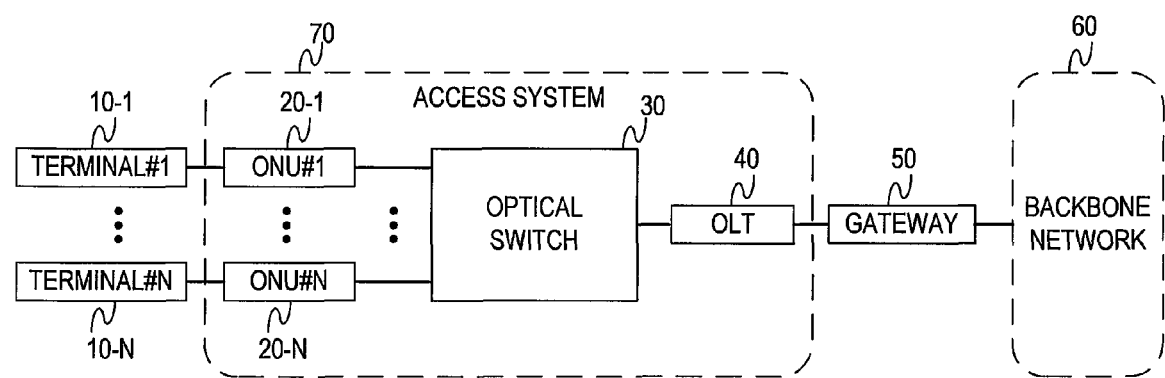
FIG. 14 is a diagram illustrating another example of a configuration of an optical network system according to the first embodiment of this invention.

A third embodiment of this invention is described next which deals with a method of cutting short the time required to complete discovery for all the ONUs 20 that have not been registered in the OLT 40 and that are requesting connection in the optical access system of FIG. 14, where the optical switch 30 detects optical signals from the ONUs 20. The description in the third embodiment focuses on differences from the first and second embodiments described above.

Figure 16:
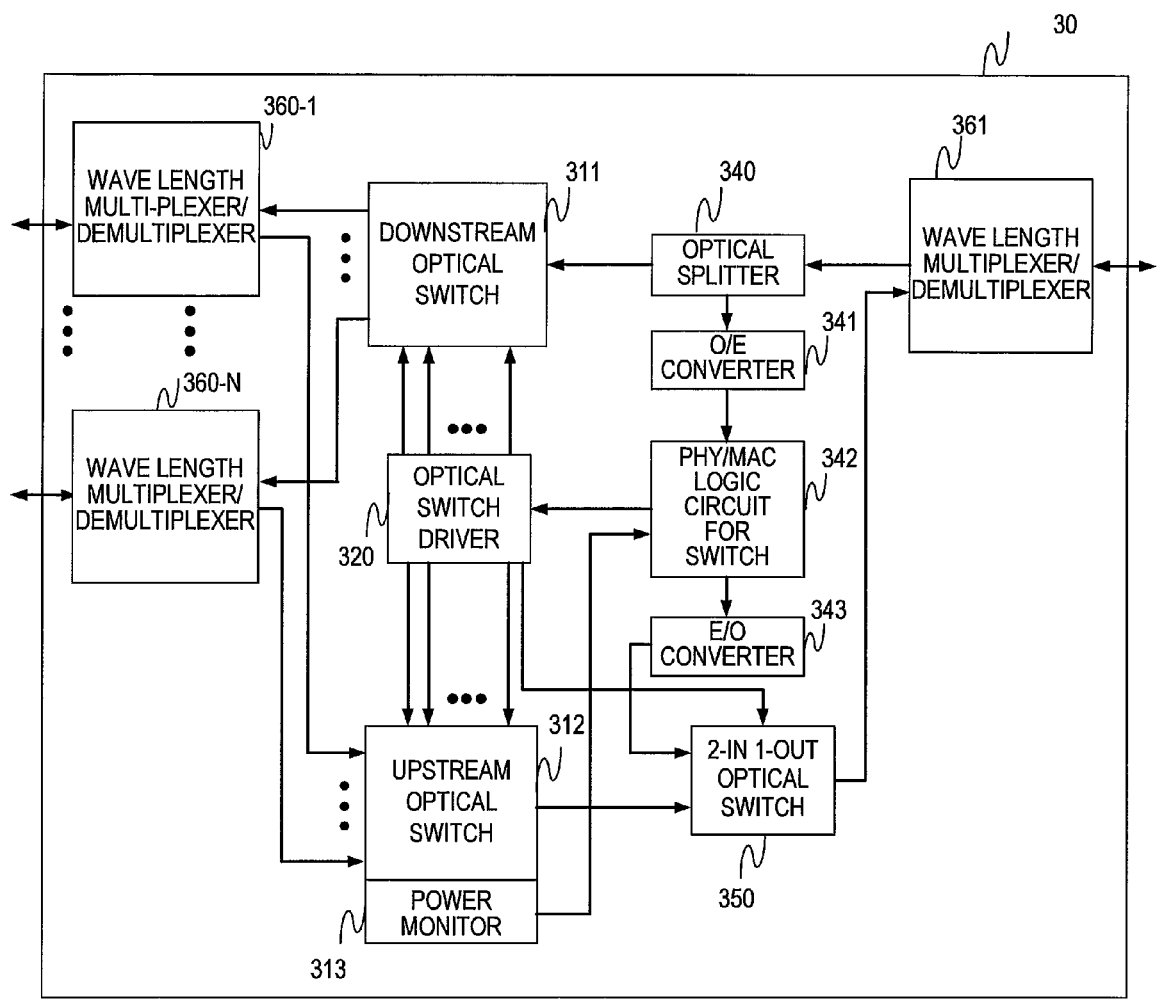
FIG. 16 is a block diagram illustrating a configuration example of an optical switch of a third embodiment of this invention.

FIG. 16 is a block diagram illustrating a configuration example of the optical switch 30 of the third embodiment.

The optical switch 30 of the third embodiment is characterized by having a power monitor 313 for detecting the presence or absence of an optical signal in the upstream optical switch 312.

The optical switch 30 has the wavelength multiplexer, demultiplexer 360, the wavelength multiplexer, demultiplexer 361, an optical splitter 340, the downstream optical switch 311, the upstream optical switch 312, a 2-in 1-out optical switch 350, the power monitor 313, an O/E converter 341, a PHY/MAC logic circuit 342 for a switch, an E/O converter 343, and an optical switch driver 320.

The optical switch 30 has a plurality of wavelength multiplexer, demultiplexers 360 (360-1 to 360-N) to receive optical signals from the ONUs 20 and sent optical signals to the ONUs 20. The wavelength multiplexer, demultiplexer 361 receives an optical signal from the OLT 40 and sends an optical signal to the OLT 40. The optical splitter 340 separates signal for downstream optical communication into a signal destined to the ONU 20 and a signal destined to the OSW 30. A 2-in 1-out optical switch may be used in place of the optical splitter 340 in order to avoid impairing an optical signal. The downstream optical switch 311 makes a switch between downstream optical communication paths. The upstream optical switch 312 makes a switch between upstream optical communication paths. The power monitor 313 detects the presence or absence of an optical signal input to the upstream optical switch 312.

The O/E converter 341 converts an optical signal that is created in the optical splitter 340 by separating a whole optical signal into an electric signal. The PHY/MAC logic circuit 342 for a switch reads frame information out of an electric signal (MPCP frame) converted from an optical signal, and controls frames sent and received by the optical switch. A port management logic circuit 343 manages the relation between each port of the OSW 30 and an LLID. The PHY/MAC logic circuit 342 for a switch controls frames sent and received by the optical switch. The E/O converter 343 converts an electric signal into an optical signal, and sends the optical signal. The optical switch driver 320 controls the downstream optical switch 311 and the upstream optical switch 312.

In the third embodiment, the configurations of the OLT 40 and the ONUs 20 are the same as in the first and second embodiments described above, except that the MPCP control logic circuit 420 of the OLT 40 and the MPCP control logic circuit 220 of each ONU 20 execute control different from the one in the first and second embodiments. Described below is the difference in control method.

First, in the case where the ONU 20 that requests the OLT 40 to establish a connection has not been registered in the OLT 40, the ONU 20 activates a light emitting device (laser) to send a specific signal to the optical switch 30 continuously. The operation of the laser is controlled by the MPCP control logic circuit 220 illustrated in FIG. 9. The specific signal sent by the laser is sufficient if the optical switch 30 is notified of the fact that the laser is turned on (in short, it is sufficient if the signal is continuous light), and does not need to have a value that is meaningful as a frame or a signal of a specific bit size. For example, a value "1" may be transmitted continuously.

Unlike the optical splitter 80, the upstream optical switch 312 of the optical switch 30 controls such that one ONU 20 is connected to the OLT 40 at a time. Therefore, a specific signal (laser light) issued from the unregistered ONU 20 does not hinder communication for data transmission that is held by the other ONUs 20.

Next, the OLT 40 requests the optical switch 30 to report the number of the ONUs 20 that have not been registered in the OLT 40 at the start of a discovery phase and that are requesting connection.

The power monitor 313 of the optical switch 30 detects the ONUs 20 whose lasers are turned on. In response to the request for the number of unregistered ONUs, the optical switch 30 reports the number of the detected ONUs 20 (connection request count Nc) to the OLT 40. When the maximum number of ONUs managed by the OLT is given as Nm, the number of the registered ONUs 20 is expressed as Nm−Nc.

Thereafter, the time interval between discovery phases (the frequency of executing a discovery phase) is dynamically changed as in the first embodiment. Alternatively, the time of the single discovery phase time is changed dynamically as in the second embodiment.

According to the third embodiment, the OLT sets a maximum time to complete discovery for all ONUs and the ratio of a discovery phase to the total number of phases is dynamically changed, or the time of the single discovery phase is dynamically changed, to suite the number of the registered ONUs 20 (Nm−Nc). In either method, discovery can be completed for all the ONUs 20 within a given period of time, or at least the time required to complete discovery for all the ONUs 20 can be cut short, and the efficiency of data transmission is prevented from dropping.

Fourth Embodiment

A fourth embodiment of this invention is described next which deals with a method of dynamically changing the frequency of executing a discovery phase or the time of the single discovery phase time without setting a maximum time to complete discovery for all ONUs. Both methods can be implemented by slightly modifying the first embodiment and the second embodiment. In the fourth embodiment, differences from the first and second embodiments are described with reference to flow charts.

Figure 17:
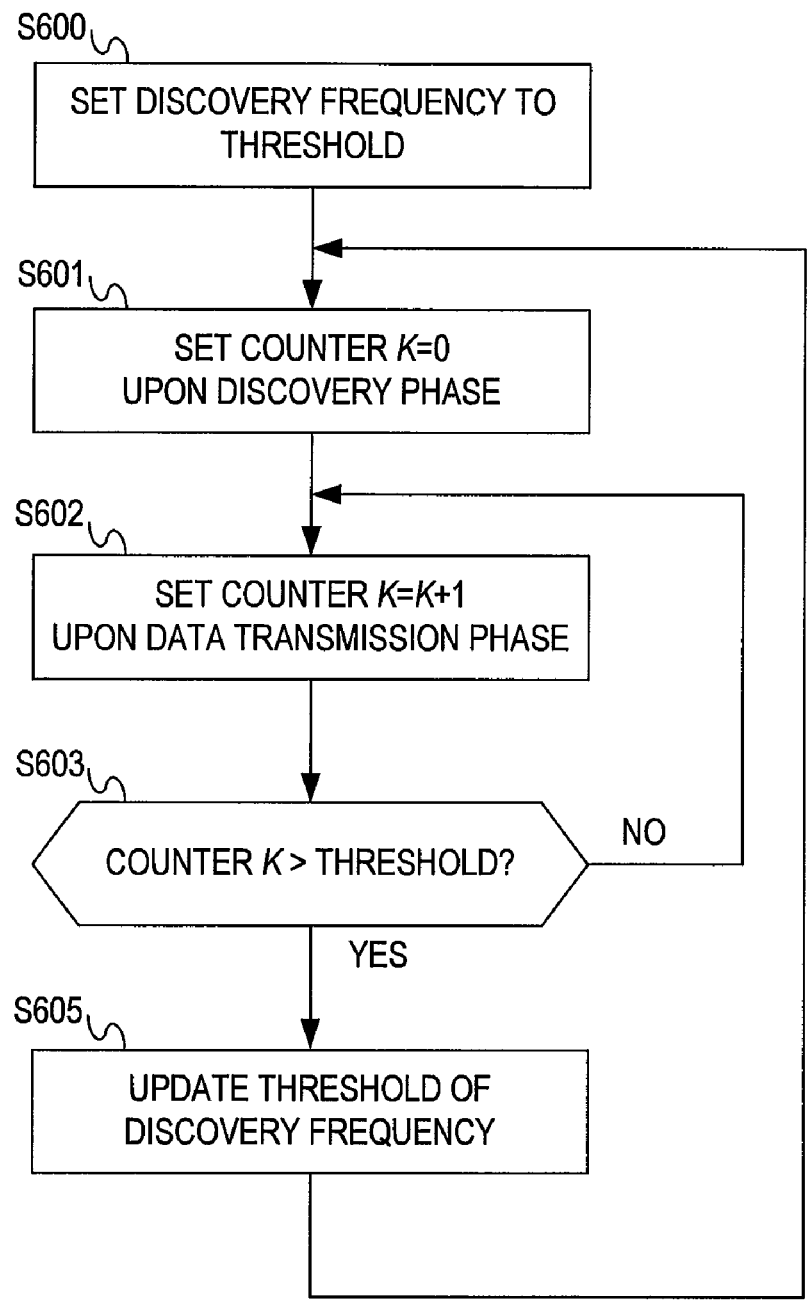
FIG. 17 is a flow chart illustrating a processing for changing a length of time of executing a discovery phase according to a fourth embodiment of this invention.

FIG. 17 is a flow chart for processing of dynamically changing the time interval between discovery phases (the frequency of executing a discovery phase), without setting a maximum time to complete discovery for all ONUs, according to the fourth embodiment.

First, a threshold that indicates the ratio of a discovery phase to data transmission phases is set (S600) and then the first communication set is started. In the first communication set, a discovery phase is executed first and the counter K is initialized to zero (S601).

Next, a data transmission phase is executed and the value of the counter K is increased by 1 (S602). Thereafter, whether or not the value of the counter K has exceeded the threshold is determined (S603). When the value of the counter K is not over the threshold, the MPCP control logic circuit 420 returns to Step S602 to repeat a data transmission phase. When the value of the counter K is over the threshold, on the other hand, the number of the ONUs 20 that have been registered by that point is referred to in order to update the threshold (S605). The MPCP control logic circuit 420 then returns to Step S601 to execute a discovery phase.

In short, the processing of the fourth embodiment is the processing of the first embodiment (the flow chart of FIG. 5) minus Step S604.

A method of dynamically changing the time of the single discovery phase time without setting a maximum time to complete discovery for all ONUs is described next.

Figure 18:
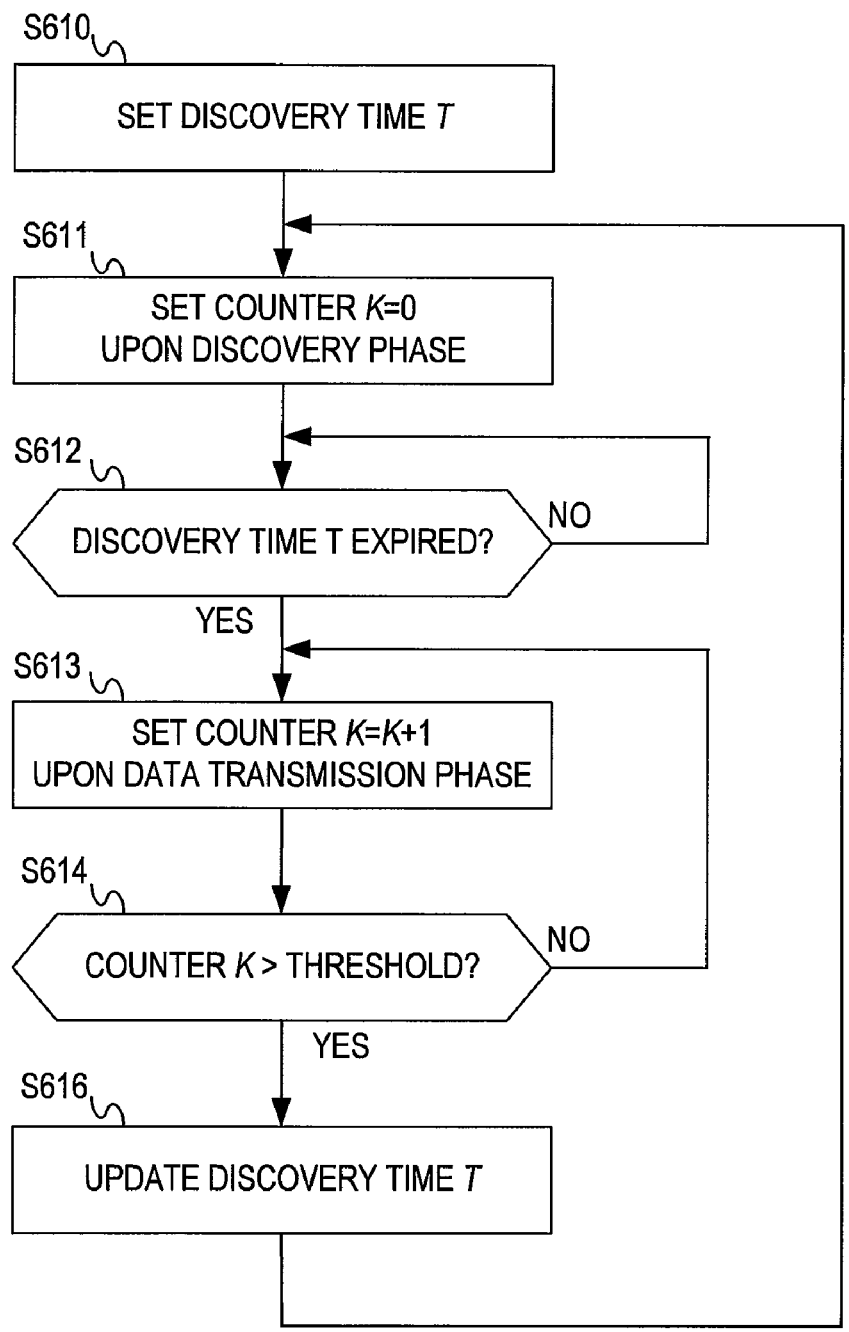
FIG. 18 is a flow chart for illustrating a processing for changing a time between the discovery phases according to the fourth embodiment of this invention.

FIG. 18 is a flow chart for processing of changing the time between discovery phases, without setting a maximum time to complete discovery for all ONUs, according to the fourth embodiment.

First, the time T of the single discovery phase time is set to an initial value (S610) and then the first communication set is started. In the first communication set, a discovery phase is executed first and the counter K is initialized to zero (S611). The MPCP control logic circuit 420 then stands by until the run time of the discovery phase exceeds the time T (S612).

When the time T elapses, a data transmission phase is executed and the value of the counter K is increased by 1 (S613). Thereafter, whether or not the value of the counter K has exceeded a given value is determined (S614). When the value of the counter K is not over the given value, a data transmission phase (S613) is repeated. When the value of the counter K is over the given value, the number of the ONUs 20 that have been registered by that point is referred to in order to update the time T of the single discovery phase time (S616). Thereafter, a discovery phase is executed (S610).

In short, the processing of the fourth embodiment is the processing of the second embodiment (the flow chart of FIG. 13) minus Step S614.

In the fourth embodiment, too, the discovery phase ratio and the time T of the single discovery phase time may be prepared in advance, or may be calculated each time as in the first and second embodiments described above. In either case, each time the next discovery phase is executed, the frequency of executing a discovery phase or the length of time of a discovery phase is updated based on the number of the registered ONUs 20, regardless of the maximum time to complete discovery for all the ONUs 20. As a result, the time required to complete discovery for all the ONUs 20 can be cut short.

The discovery speed-up methods of the embodiments of this invention described above are applicable to any optical access system that uses the optical splitter 80 or the optical switch 30.

A detailed description has been given on an optical access system according to embodiments of this invention. However, the description given above is merely about a mode of carrying out this invention, and various modifications can be made without departing from the technical concept and technical scope of this invention.

What is claimed is:

1. An optical access system comprising:
   an optical line terminal which is connected to another network;
   a plurality of optical network units, each of which is connected to a user terminal; and
   at least one of an optical switching unit and an optical splitter, which is installed between the optical line terminal and the plurality of optical network units,
   wherein the optical line terminal is configured to:
   allocate a length of time to each of a set of discovery phases for detecting the plurality of optical network units, and a length of time to each of a set of data transmission phases for transferring data from the plurality of optical network units; and change a ratio of the length of time of the set of discovery phases to the length of time of the set of data transmission phases so that the length of time of each of the discovery phases is shortened in the case where a number of the optical network units that are registered in the optical line terminal increases.

2. The optical access system according to claim 1, wherein the optical line terminal sets a threshold time period for completing discovery of the plurality of optical network units, wherein the set threshold time period includes at least one discovery phase and at least one data transmission phase, and wherein the optical line terminal is configured to:

count a number of the optical network units that are registered in the optical line terminal after the set threshold time period elapses; and determine an interval between the discovery phases so that the interval between the discovery phases within the set threshold time period becomes larger in the case where the counted number of the optical network units increases.

3. The optical access system according to claim 2, wherein the optical switching unit is installed between the optical line terminal and the plurality of optical network units, wherein the optical switching unit comprises a detector for detecting optical signals from the plurality of optical network units, wherein the optical switching unit notifies a number of unregistered optical network units to the optical line terminal in the case of detecting the optical signals from optical network units that are not registered in the optical line terminal, and wherein the optical line terminal is configured to:

calculate the number of the optical network units that are registered in the optical line terminal based on the notified number of the unregistered optical network units; and determine the interval between the discovery phases so that the interval between the discovery phases within the set threshold time period becomes larger in the case where the calculated number of the optical network units increases.

4. The optical access system according to claim 2, wherein the optical line terminal is configured to:

hold discovery phase ratio information which includes different intervals between the discovery phases for different numbers of the optical network units that are registered in the optical line terminal; and choose, from the held discovery phase ratio information, an interval between the discovery phases that is suitable for a current number of the optical network units that are registered in the optical line terminal.

5. The optical access system according to claim 2, wherein the optical line terminal calculates an interval between the discovery phases by using the counted number of the optical network units after the set threshold time period elapses.

6. The optical access system according to claim 1, wherein the optical line terminal sets a threshold time period for completing discovery of the plurality of optical network units, wherein the set threshold time period contains at least one discovery phase and at least one data transmission phase, and wherein the optical line terminal is configured to:

count a number of the optical network units that are registered in the optical line terminal after the set threshold time period elapses; and determine the length of time of each discovery phase so that the length of time of each single discovery phase becomes shorter in the case where the counted number of the optical network units increases.

7. The optical access system according to claim 6, wherein the optical switching unit is installed between the optical line terminal and the plurality of optical network units, wherein the optical switching unit comprises a detector for detecting optical signals from the plurality of optical network units, wherein the optical switching unit notifies a number of unregistered detected optical network units which is unregistered in the optical line terminal in the case of detecting the optical signals from optical network units that are not registered in the optical line terminal, and wherein the optical line terminal is configured to:

calculate the number of the optical network units that are registered in the optical line terminal based on the number of the unregistered optical network units; and determine the length of time of each discovery phase so that the length of time of each single discovery phase becomes shorter in the case where the calculated number of the optical network units increases.

8. The optical access system according to claim 6, wherein the optical line terminal is configured to:

hold discovery time information which includes different lengths of time of each single discovery phase of the set for different numbers of the optical network units that are registered in the optical line terminal; and choose, from the held discovery time information, a length of time of each single discovery phase that is suitable for a current number of the optical network units that are registered in the optical line terminal.

9. The optical access system according to claim 6, wherein the optical line terminal calculates the length of time of each single discovery phase by using the counted number of the optical network units after the set threshold time period elapses.

10. An optical line terminal which is connected to another network, the optical line terminal communicating to a plurality of optical network units, each of which is connected to the terminal via at least one of an optical switching unit and an optical splitter, the optical line terminal being configured to:

allocate a length of time to each of a set of discovery phases for detecting the plurality of optical network units, and a length of time to each of a set of data transmission phases for transferring data from the plurality of optical network units; and change a ratio of the length of time of the set of discovery phases to the length of time of the set of data transmission phases so that the length of time of each of the discovery phases is shortened in the case where a number of the optical network units that are registered in the optical line terminal increases.

11. The optical line terminal according to claim 10, which is configured to:

set a threshold time period for completing discovery of the plurality of optical network units, the set threshold time period including at least one discovery phase and at least one data transmission phase;

count a number of the optical network units that are registered in the optical line terminal after the set threshold time period elapses; and determine an interval between the discovery phases so that the interval between the discovery phases within the set threshold time period becomes larger in the case where the counted number of the optical network units increases.

12. The optical line terminal according to claim 11, wherein the optical switching unit is installed between the optical line terminal and the plurality of optical network units, wherein the optical switching unit comprises a detector for detecting optical signals from the plurality of optical network units, wherein the optical switching unit notifies a number of unregistered optical network units to the optical line terminal in the case where detecting the optical signals from optical network units that are not registered in the optical line terminal, and wherein the optical line terminal is configured to:

calculate the number of the plurality of optical network units that are registered in the optical line terminal based on the notified number of the unregistered optical network units; and determine the interval between the discovery phases so that the interval between the discovery phases within the set threshold time period becomes larger in the case where the calculated number of the optical network units increases.

13. The optical line terminal according to claim 11, which is configured to:

hold discovery phase ratio information which includes different intervals between the discovery phases for different numbers of the optical network units that are registered in the optical line terminal; and choose from the held discovery phase ratio information an interval between the discovery phases that is suitable for a current number of the optical network units that are registered in the optical line terminal.

14. The optical line terminal according to claim 11, which calculates an interval between the discovery phases using the counted number of the optical network units after the set threshold time period elapses.

15. The optical line terminal according to claim 10, which is configured to:

set a threshold time period for completing discovery of the plurality of optical network units, the set threshold time period including at least one discovery phase and at least one data transmission phase;

count a number of the optical network units that are registered in the optical line terminal after the set threshold time period elapses; and determine the length of time of each discovery phase so that the length of time of each single discovery phase becomes shorter in the case where the counted number of the optical network units increases.

16. The optical line terminal according to claim 15, wherein the optical switching unit is installed between the optical line terminal and the plurality of optical network units, wherein the optical switching unit comprises a detector for detecting optical signals from the optical network units, wherein the optical switching unit notifies a number of the detected optical network units which is unregistered in the optical line terminal in the case of detecting the optical signals from optical network units that are not registered in the optical line terminal, and wherein the optical line terminal is configured to:

calculate the number of the optical network units that are registered in the optical line terminal based on the number of the unregistered optical network units; and determine the length of time of each discovery phase so that the length of time of each single discovery phase becomes shorter in the case where the calculated number of the optical network units increases.

17. The optical line terminal according to claim 15, which is configured to:

hold discovery time information which includes different lengths of time of each single discovery phase of the set for different numbers of the optical network units that are registered in the optical line terminal; and choose from the held discovery time information a length of time of each single discovery phase that is suitable for a current number of the optical network units that are registered in the optical line terminal.

18. The optical line terminal according to claim 15, which calculates the length of time of each single discovery phase using the counted number of the optical network units after the set threshold time period elapses.

* * * * *